United States Patent
Aas et al.

(10) Patent No.: US 6,437,548 B2
(45) Date of Patent: Aug. 20, 2002

(54) COORDINATED SWITCHING IN A MULTIPLE SWITCHING REGULATOR SYSTEM TO LOWER PEAK CURRENT LOAD

(75) Inventors: Eric F Aas; Thomas C Oliver, both of Windsor; Richard L Kochis, Ft Collins, all of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/842,334

(22) Filed: Apr. 25, 2001

Related U.S. Application Data

(63) Continuation of application No. 09/437,669, filed on Nov. 10, 1999, now Pat. No. 6,265,855.

(51) Int. Cl.[7] .............................. G05F 1/40; G05F 1/577
(52) U.S. Cl. ....................................... 323/272; 323/267
(58) Field of Search ................................ 323/267, 272, 323/282; 307/11, 12, 15, 30, 31, 32, 34, 38, 41

(56) References Cited

U.S. PATENT DOCUMENTS

| | | | |
|---|---|---|---|
| 5,442,534 A | | 8/1995 | Cuk et al. ..................... 363/16 |
| 5,495,164 A | * | 2/1996 | Heng ......................... 323/222 |
| 5,905,369 A | * | 5/1999 | Ishii et al. ................... 323/272 |
| 6,034,514 A | * | 3/2000 | Sakai .......................... 323/225 |
| 6,043,634 A | * | 3/2000 | Nguyen et al. ............. 323/272 |

FOREIGN PATENT DOCUMENTS

| | | | |
|---|---|---|---|
| JP | 5-8072370 | 4/1983 | ........... H02M/3/335 |
| JP | 5-095672 | 4/1993 | ............. H02M/3/28 |
| JP | 6-351228 | 12/1994 | ............. H02M/1/10 |
| JP | 9-289773 | 11/1997 | ............. H02M/3/28 |

* cited by examiner

*Primary Examiner*—Rajnikant B. Patel
(74) *Attorney, Agent, or Firm*—Alexander J. Neudeck

(57) ABSTRACT

The switching transistors in multiple switching regulators sharing the same input power source are coordinated to lower the peak current drain on the input power source. The turn on times of the transistors in each regulator are set so that each switching transistor turns on at a predetermined time in a cycle. The predetermined time for each regulator is chosen so that the maximum peak current drain on the input power source is minimized. The predetermined times may be changed on-the-fly by inputs to the system when information about current or projected output loads are known. The transistors in each regulator may also be turned on when the transistor in the previous regulator in a sequence turns off. Another embodiment lets the regulator with the largest change in input current over a cycle run independently. The other regulators then switch in a designated order, or at designated times after the first regulator turns its switch off.

20 Claims, 10 Drawing Sheets

COORDINATED SWITCHING IN A MULTIPLE SWITCHING REGULATOR SYSTEM TO LOWER PEAK CURRENT LOAD

CROSS REFERENCE

This application is a continuation of 09/437,669 filed on Nov. 10, 1999, now U.S. Pat. No. 6,265,855.

FIELD OF THE INVENTION

This invention relates to switching power supplies and more particularly to systems with multiple switching regulators drawing current from the same input power source.

BACKGROUND OF THE INVENTION

Many electronic devices require multiple power supplies. For example, a device with both analog and digital circuits may require +5 volts for the digital logic, and +12 Volts, −12 volts for the analog circuitry. In battery powered devices, switching power supplies are a way to create these power supplies.

A switching power supply may function by having a controller switch a transistor at high frequency. This frequency is typically in the 20 kHz to 1 MHz range. This draws current from the input power source to produce a chopped intermediate voltage that is then filtered by an L-C (inductor-capacitor) circuit to produce a smoother output voltage. The output voltage is controlled by varying the on time to off-time ratio of the transistor. Unfortunately, if there are multiple regulators in the system, the switching transistors of these multiple regulators may switch on and off in phase. This switching in phase can causes multiple regulators to be drawing current at the same time, this increases the current drain on the input power source. In fact, with enough switching transistors switching in phase, the current drain on the input power source may increase to the point where regulation cannot be maintained. Due to the high series resistance of many types of batteries, battery powered devices are particularly susceptible to this condition.

Accordingly, there is a need in the art for a multiple voltage switching power supply controller that helps lower the peak current drain on the input power source.

SUMMARY OF THE INVENTION

The invention coordinates the current drawn by multiple switching regulators sharing a common input power source to lower the peak current drain on the input power source. Coordination of the current drawn can be implemented with simple logic, or can be adapted to a complicated algorithm that takes into account many different variables such as dynamic loading of different regulators or worst case scenarios. One embodiment sequences the turn-on, turn-off, or intermediate switching times of the switches in each regulator so that each regulator draws current at a predetermined time in a cycle. The predetermined time for each regulator is chosen so that the maximum peak current drain on the input power source is minimized. The predetermined times may be changed on-the-fly by inputs to the system when information about current or projected output loads are known. Another embodiment merely sequences the turn-on or turn-off times of the switches in each regulator so that each regulator starts drawing current when the previous regulator in the sequence stops drawing current. Another embodiment lets the regulator with the largest change in input current over a cycle run independently. The other regulators then draw current in a designated order or at designated times after the first regulator turn stops drawing current.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENTS

Figure 1:
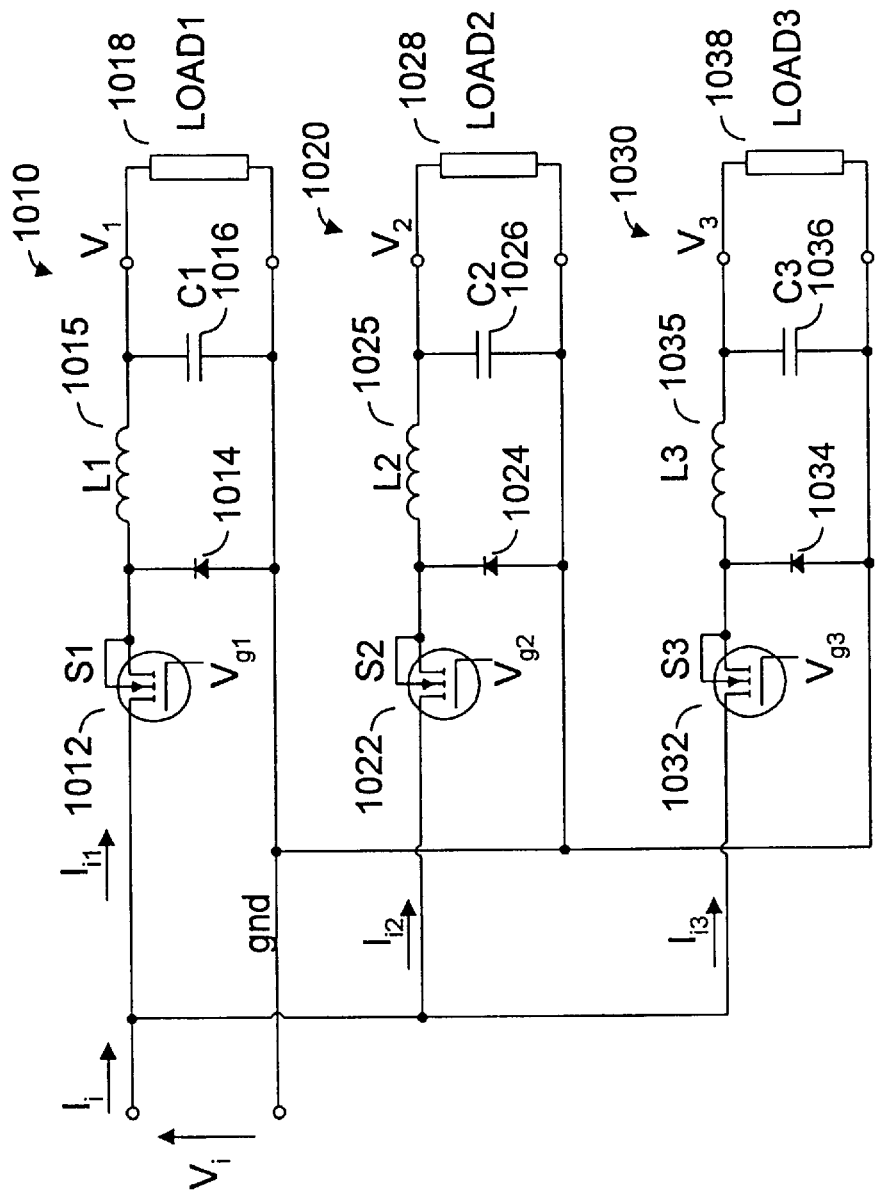
FIG. 1 is a schematic diagram of multiple buck type switching regulators with the same input power source.
Figure 2:
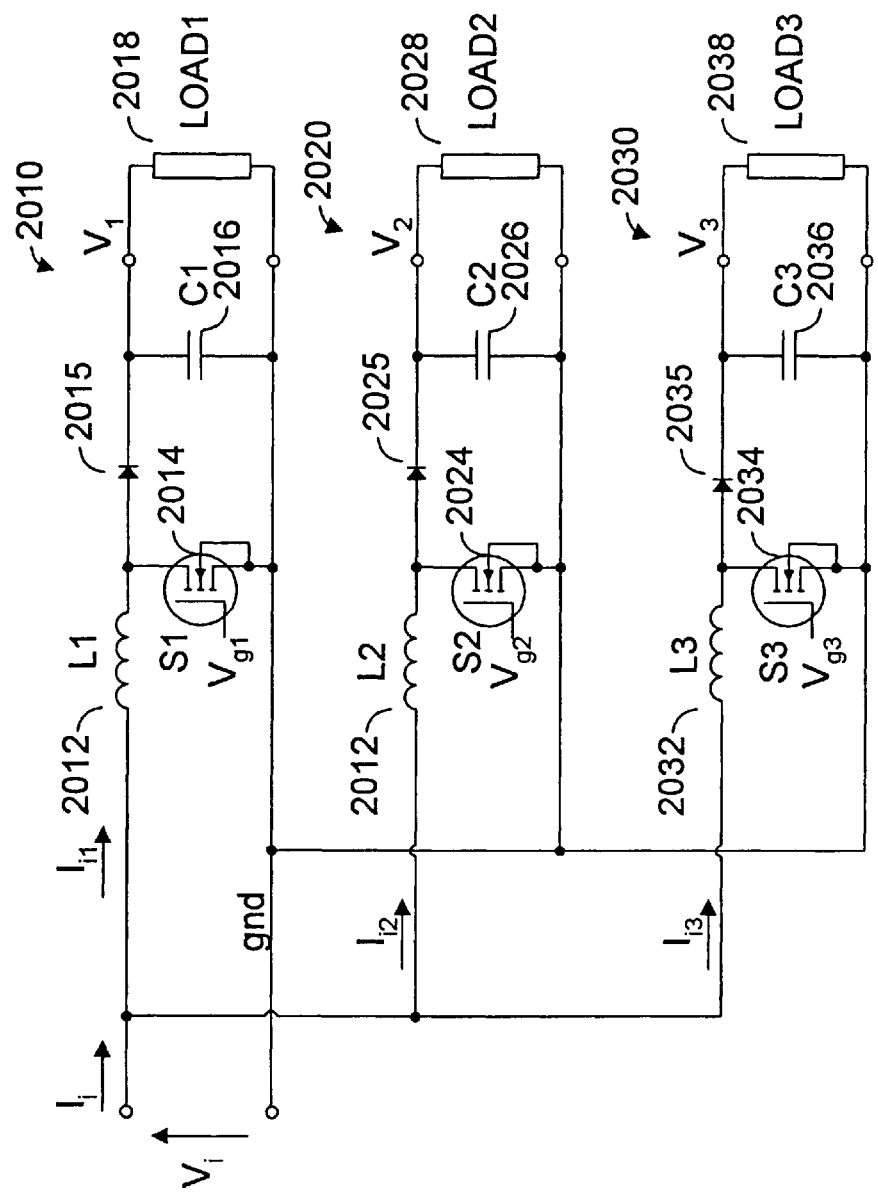
FIG. 2 is a schematic diagram of multiple boost type switching regulators with the same input power source.

FIG. 1 is a schematic diagram of multiple buck type switching regulators with the same input power source. FIG. 2 is a schematic diagram of multiple boost type switching regulators with the same input power source. These types of regulators were chosen for exemplary purposes only. It should be understood that this invention is applicable to other types of switching regulators known to those of ordinary skill in the art. Furthermore, the type of switch in these regulators is shown as an N-channel MOSFET. This is also only for exemplary purposes and other types of switching devices know to those skilled in the art could be used.

In FIG. 1, the input voltage to the multiple regulators 1010, 1020, and 1030 is $V_i$. The aggregate input current into the multiple regulators is $I_i$. Input current into the first regulator 1010 is $I_{i1}$. The input current into the second regulator 1020 is $I_{i2}$ and so on, such that the input current into the third regulator 1030 is $I_{i3}$.

In FIG. 1, first regulator 1010 is shown comprising switching transistor S1, 1012, diode 1014, inductor L1, 105, and filter capacitor C1 1016. First regulator 1010 is shown as producing output voltage $V_1$ into load LOAD1 1018. Switching transistor S1 is shown as an N-type enhancement MOSFET with its drain connected to $V_i$, its body and source connected to the cathode of diode 1014, and its gate connected to control voltage $V_{g1}$. The anode of diode 1014 is shown being connected to the reference node of $V_i$, gnd. The cathode of diode 1014, source and body of S1, are also connected a first terminal of inductor L1, 1015. The second terminal of L1, 1015, is connected to a first terminal of filter capacitor C1, 1016. The second terminal of filter capacitor C1, 1016 is shown connected to gnd. The load on the first regulator LOAD 1, 1018 is shown connected in parallel with filter capacitor C1 1016.

Second regulator 1020 is shown with the same circuit design as first regulator 1010. Second regulator 1020 is shown comprising switching transistor S2, 1022, diode 1024, inductor L2, 1025, and filter capacitor C2 1026. Second regulator 1020 is shown as producing output voltage $V_2$ into load LOAD2 1028. Switching transistor S2 is shown as an N-type enhancement MOSFET with its drain connected to $V_i$, its body and source connected to the cathode of diode 1024, and its gate connected to control voltage $V_{g2}$. The anode of diode 1024 is shown being connected to the reference node of $V_i$, gnd. The cathode of diode 1024, source and body of S2, are also connected a first terminal of inductor L2, 1025. The second terminal of L2, 1025, is connected to a first terminal of filter capacitor C2, 1026. The second terminal of filter capacitor C2, 1026 is shown connected to gnd. The load on the first regulator LOAD2, 1028 is shown connected in parallel with filter capacitor C2 1026.

Third regulator 1030 is shown with the same circuit design as first regulator 1010 and second regulator 1020. Third regulator 1030 is shown comprising switching transistor S3, 1032, diode 1034, inductor L3, 1035, and filter capacitor C3 1036. Second regulator 1030 is shown as producing output voltage $V_3$ into load LOAD3 1038. Switching transistor S3 is shown as an N-type enhancement MOSFET with its drain connected to $V_i$, its body and source connected to the cathode of diode 1034, and its gate connected to control voltage $V_{g3}$. The anode of diode 1034 is shown being connected to the reference node of $V_i$, gnd. The cathode of diode 1034, source and body of S3, are also connected a first terminal of inductor L3, 1035. The second terminal of L3, 1035, is connected to a first terminal of filter capacitor C3, 1036. The second terminal of filter capacitor C3, 1036 is shown connected to gnd. The load on the first regulator LOAD3, 1038 is shown connected in parallel with filter capacitor C3 1036.

Although only three are shown, multiple regulators 1010, 1020, and 1030 are intended to represent an arbitrary number of supply voltages generated from a single input power source. In addition, the basic design of these supplies is a buck regulator type design. However, it should be understood that the principles of this invention are not limited to this particular type of regulator and that the principles of this invention could also be used with boost type, or buck-boost type, or a combination of switching regulator types.

In FIG. 2, the input voltage to the multiple regulators 2010, 2020, and 2030 is $V_i$. The aggregate input current into the multiple regulators is $I_i$. Input current into the first regulator 2010 is $I_{i1}$. The input current into the second regulator 2020 is $I_{i2}$ and so on, such that the input current into the third regulator 2030 is $I_j$.

In FIG. 2, first regulator 2010 is shown comprising switching transistor S1, 2014, diode 2015, inductor L1, 2012, and filter capacitor C1 2016. First regulator 2010 is shown as producing output voltage $V_1$ into load LOAD1 2018. Inductor L1 2012 is shown connected between $V_i$ and the drain of switching transistor S1 2014. Switching transistor S1 is shown as an N-type enhancement MOSFET with its body and source connected to the reference node of $V_i$, gnd, and its gate connected to control voltage $V_{g1}$. The anode of diode 2015 is connected to the drain of switching transistor S1 2014. The cathode of diode 2015 is connected a first terminal of filter capacitor C1 2016. The second terminal of C1 2016 is connected to gnd. The load on the first regulator LOAD 1, 2018 is shown connected in parallel with filter capacitor C1 2016.

In FIG. 2, second regulator 2020 is shown comprising switching transistor S2, 2024, diode 2025, inductor L2, 2022, and filter capacitor C2 2026. Second regulator 2020 is shown as producing output voltage $V_2$ into load LOAD2 2028. Inductor L2 2022 is shown connected between $V_i$ and the drain of switching transistor S2 2024. Switching transistor S2 is shown as an N-type enhancement MOSFET with its body and source connected to the reference node of $V_i$, gnd, and its gate connected to control voltage $V_{g2}$. The anode of diode 2025 is connected to the drain of switching transistor S2 2024. The cathode of diode 2025 is connected a first terminal of filter capacitor C2 2026. The second terminal of C2 2026 is connected to gnd. The load on the first regulator LOAD2, 2028 is shown connected in parallel with filter capacitor C2 2026.

In FIG. 3, third regulator 2030 is shown comprising switching transistor S3, 2034, diode 2035, inductor L3, 2032, and filter capacitor C3 2036. Second regulator 2030 is shown as producing output voltage $V_3$ into load LOAD3 2038. Inductor L3 2032 is shown connected between $V_i$ and the drain of switching transistor S3 2034. Switching transistor S3 is shown as an N-type enhancement MOSFET with its body and source connected to the reference node of $V_i$, gnd, and its gate connected to control voltage $V_{g3}$. The anode of diode 2035 is connected to the drain of switching transistor S3 2034. The cathode of diode 2035 is connected a first terminal of filter capacitor C3 2036. The second terminal of C3 2036 is connected to gnd. The load on the first regulator LOAD3, 2038 is shown connected in parallel with filter capacitor C3 2036.

Figure 3A:
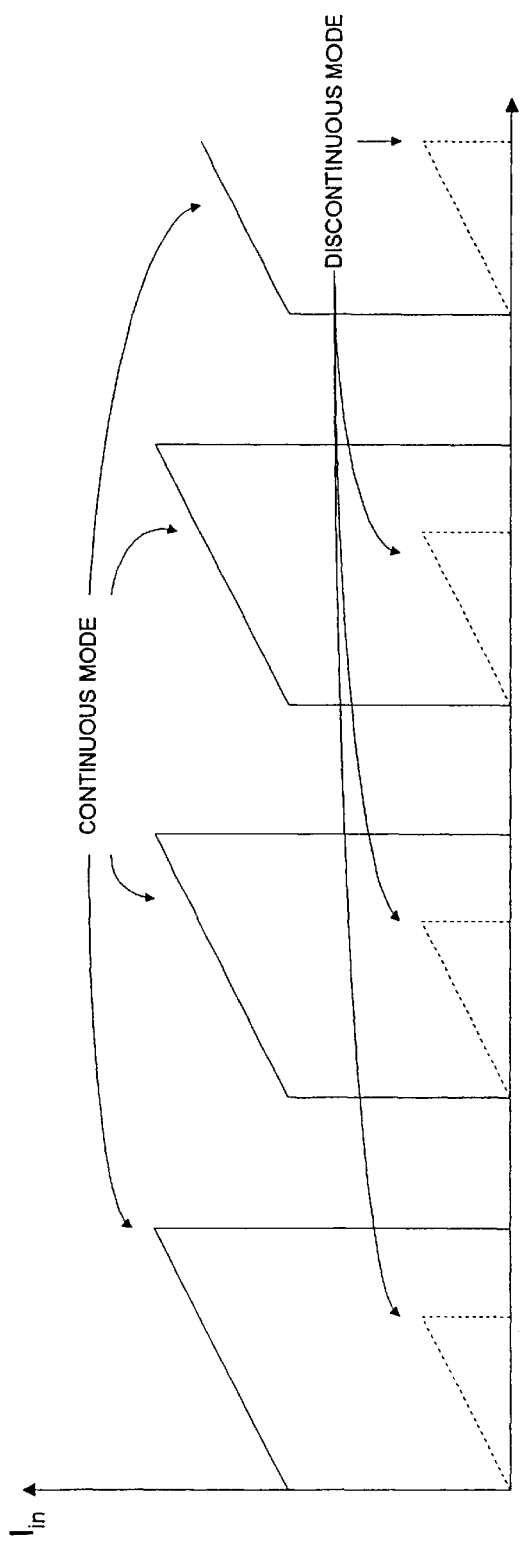
FIG. 3A is plot of the typical input current waveform for a buck type switching regulator in continuous mode and discontinuous mode.
Figure 3B:
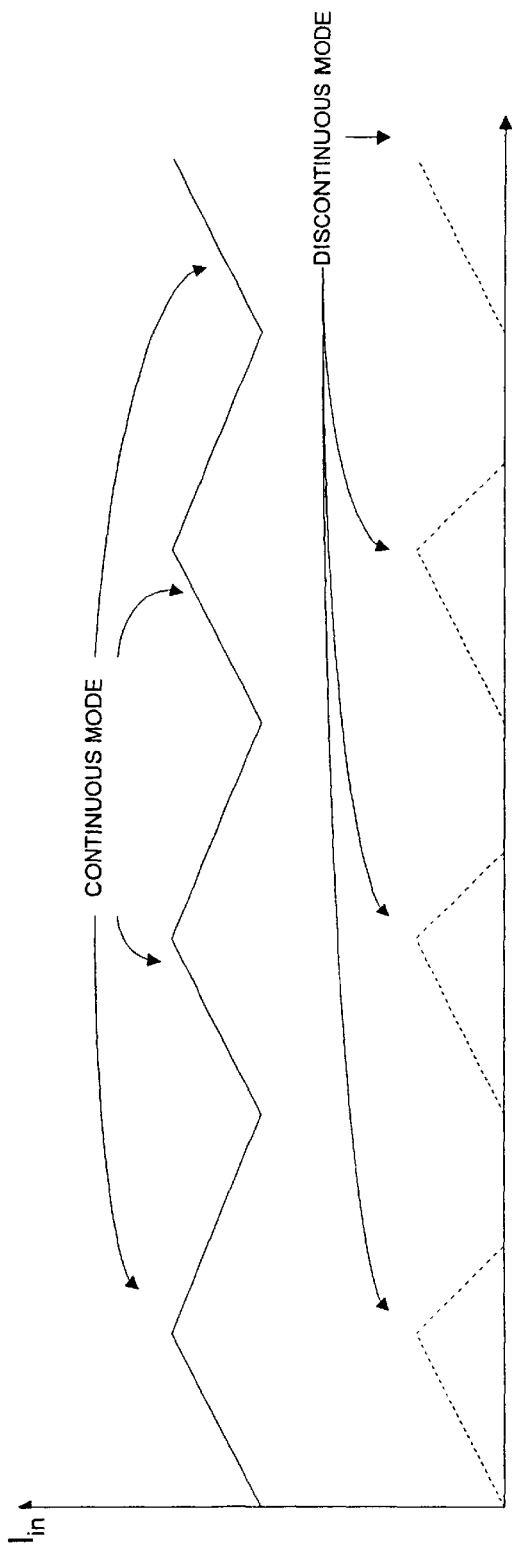
FIG. 3B is plot of the typical input current waveform for a boost type switching regulator in continuous mode and discontinuous mode.

FIG. 3A is a plot of the typical input current waveforms for a buck type switching regulator in continuous mode and discontinuous mode. FIG. 3B is plot of the typical input current waveforms for a boost type switching regulator in continuous mode and discontinuous mode. Note that these current waveforms come to a peak before declining. When the current peaks of multiple regulators drawing from the same input power source coincide roughly in time a large input current peak occurs. This invention helps prevent that condition so that the overall peak input current is reduced.

Figure 4A:
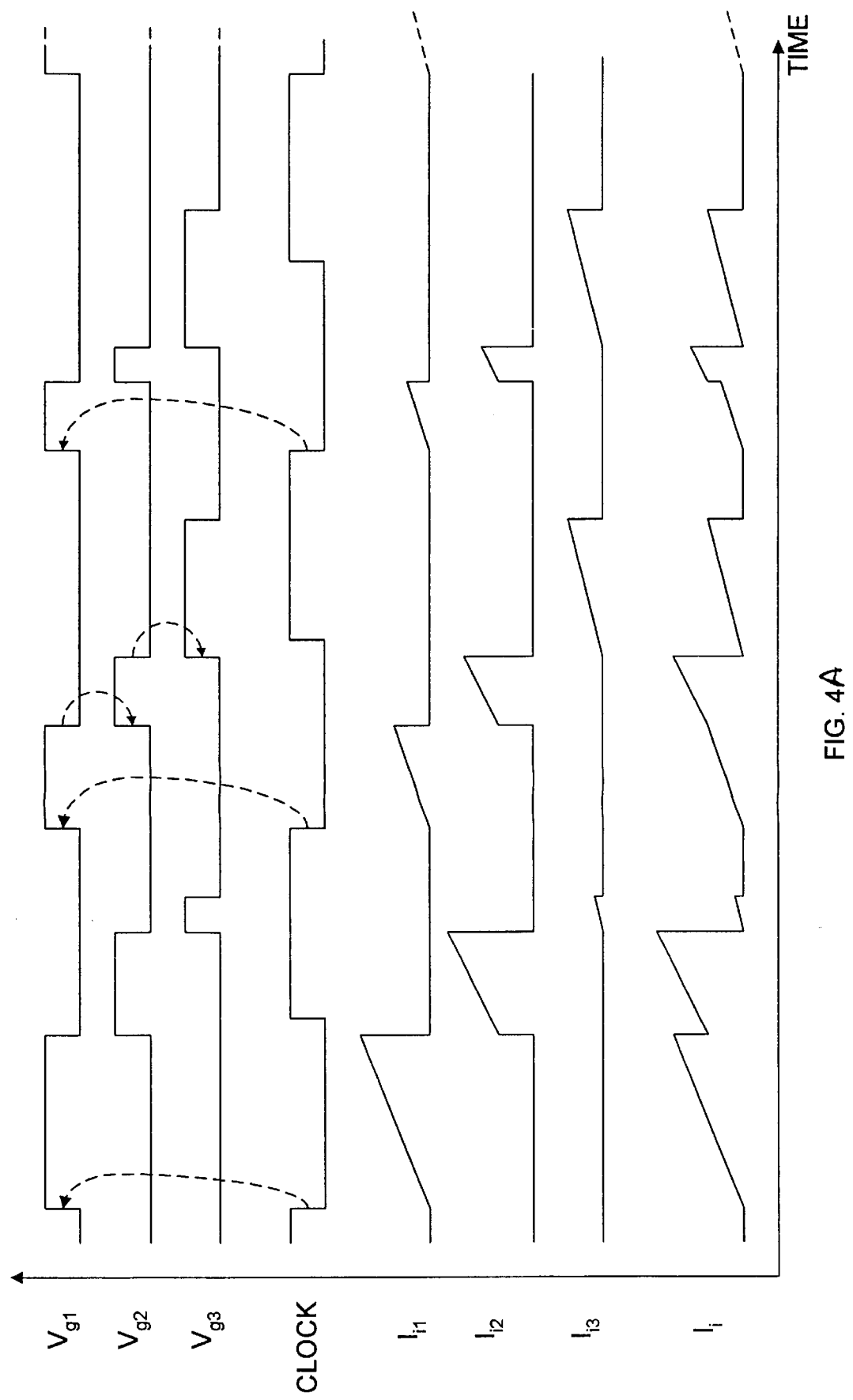
FIG. 4A illustrates a sample set of control waveforms and input power source current for multiple buck switching regulators utilizing sequential switching of switching transistors.

FIG. 4A illustrates an example set of control signals and current waveforms for sequential switching of transistors in multiple buck regulators. Signal CLOCK is a periodic waveform that sets triggers the switching of the first regulator in the sequence. That regulator is controlled by $V_{g1}$. Note that $V_{g1}$ rises turning on the switching transistor in the first regulator when CLOCK falls. When $V_{g1}$ falls switching off the switching transistor in the first regulator, Vg2 rises turning on the switching transistor in the second regulator in the sequence. Then when $V_{g2}$ falls switching off the switching transistor in the second regulator, $V_{g3}$ rises turning on the switching transistor in the third regulator in the sequence. After that, $V_{g3}$ falls turning off the switching transistor in the third regulator. The falling edge of signal CLOCK starts the sequence again.

Also shown on FIG. 4A are example input currents ($I_{i1}$, $I_{i2}$, $I_{i3}$) for each of the three power supplies when controlled by sequenced control signals described above and shown in FIG. 4A. The sum of these input currents is the total input current load on the input power source, $I_i$. Note that the sequenced switching of the transistors in the three supplies in this example reduces the total current load when compared to the situation where all three switching transistors are switched so that all three supplies reach their peak current at about the same time.

In FIG. 4A, the control signals of all the power supplies are shown to switch off the transistors in all those power supplies before a new cycle starts with the falling edge of CLOCK. However, this is not required. For supplies that have dynamic loads, the length of time that each switching transistor of each regulator may be set according to an error signal derived from the output voltage of that regulator. The system may not operate with optimally low peak input current depending on the dynamic loading, but regulation should be maintained as long as the signal to switch off the transistor in a particular regulator occurs before or nearly the same time as the signal to switch on that particular transistor occurs again. Furthermore, arranging the sequence that supplies from the largest input anticipated current load to the smallest will help reduce the peak input current even when there are two or more switching transistors in different supplies on at the same time.

Figure 4B:
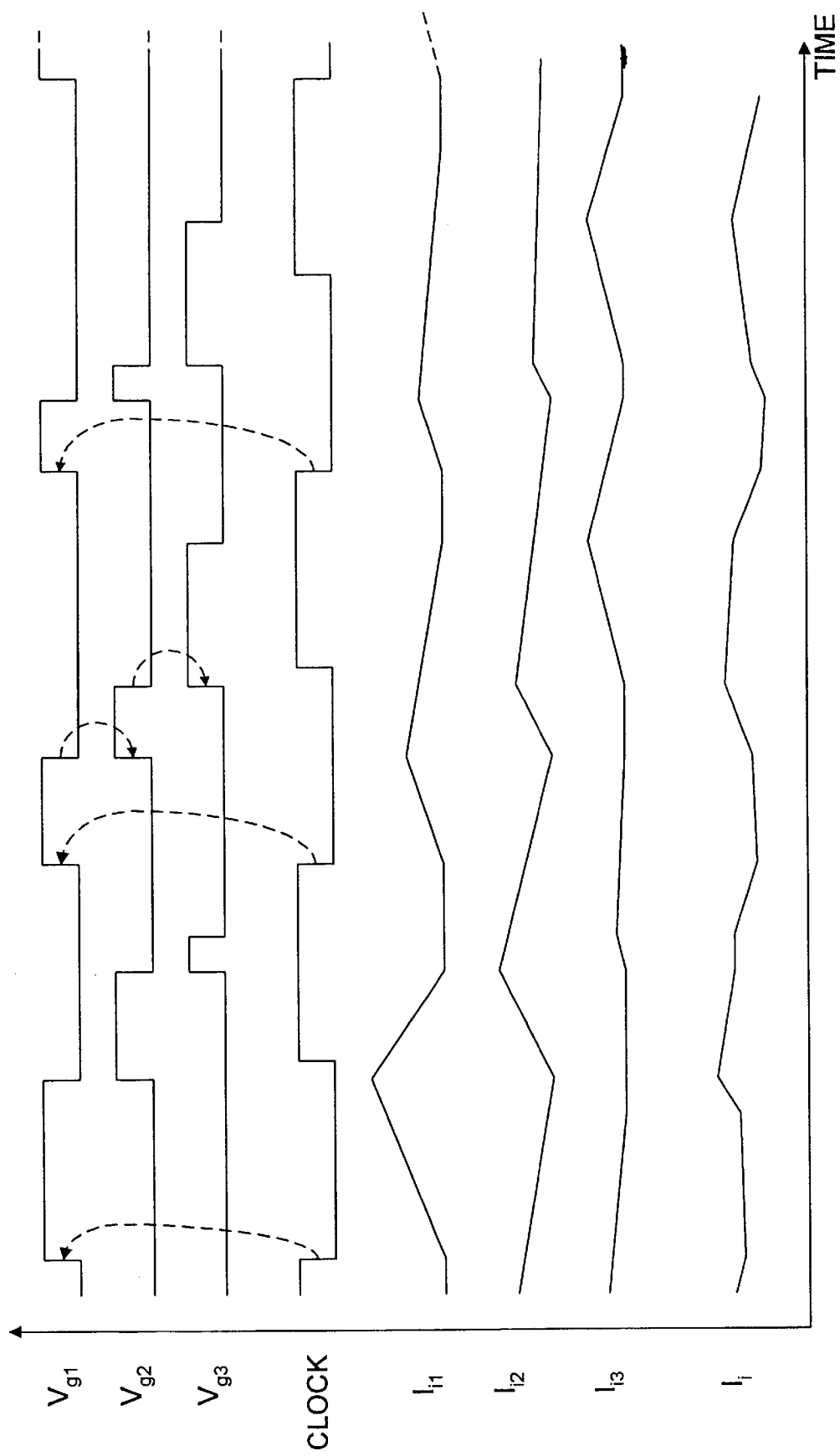
FIG. 4B illustrates a sample set of control waveforms and input power source current for multiple boost switching regulators utilizing sequential switching of switching transistors.

FIG. 4B illustrates an example set of control signals and current waveforms for sequential switching of transistors in multiple boost regulators. Signal CLOCK is a periodic waveform that sets triggers the switching of the first regulator in the sequence. That regulator is controlled by $V_{g1}$. Note that $V_{g1}$ rises turning on the switching transistor in the first regulator when CLOCK falls. When $V_{g1}$ falls switching off the switching transistor in the first regulator, Vg2 rises turning on the switching transistor in the second regulator in the sequence. Then when $V_{g2}$ falls switching off the switching transistor in the second regulator, $V_{g3}$ rises turning on the switching transistor in the third regulator in the sequence. After that, $V_{g3}$ falls turning off the switching transistor in the third regulator. The falling edge of signal CLOCK starts the sequence again.

Also shown on FIG. 4B are example input currents ($I_{i1}$, $I_{i2}$, $I_{i3}$) for each of the three power supplies when controlled by sequenced control signals described above and shown in FIG. 4B. The sum of these input currents is the total input current load on the input power source, $I_i$. Note that the sequenced switching of the transistors in the three supplies in this example reduces the total current load when compared to the situation where all three switching transistors are switched so that all three supplies reach their peak current at about the same time.

In FIG. 4B, the control signals of all the power supplies are shown to switch off the transistors in all those power supplies before a new cycle starts with the falling edge of CLOCK. However, this is not required. For supplies that have dynamic loads, the length of time that each switching transistor of each regulator may be set according to an error signal derived from the output voltage of that regulator. The system may not operate with optimally low peak input current depending on the dynamic loading, but regulation should be maintained as long as the signal to switch off the transistor in a particular regulator occurs before or nearly the same time as the signal to switch on that particular transistor occurs again. Furthermore, arranging the sequence that supplies from the largest input anticipated current load to the smallest will help reduce the peak input current even when there are two or more switching transistors in different supplies on at the same time.

Figure 5:
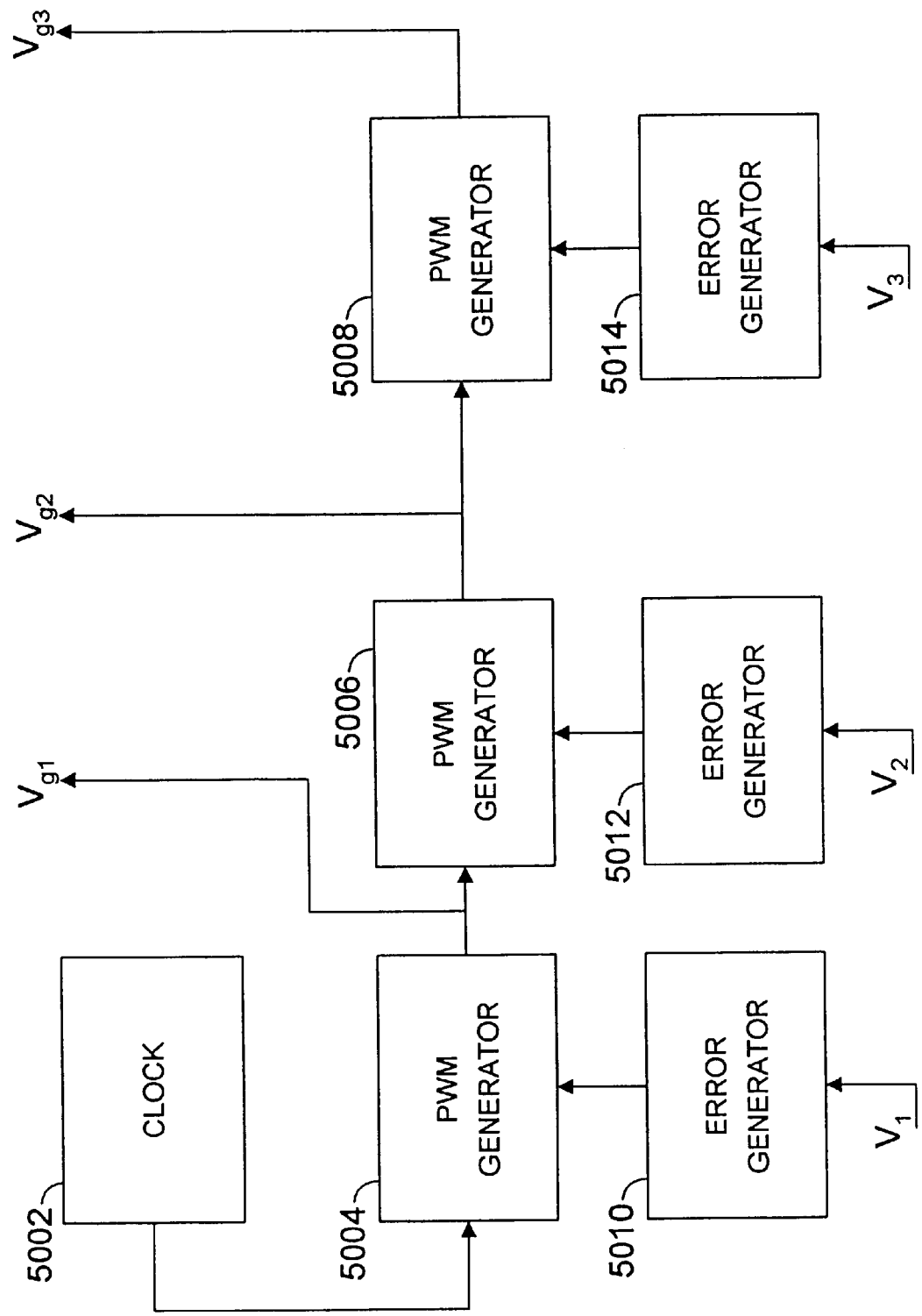
FIG. 5 is a block diagram illustrating a control system that sequentially switches the switching transistors of multiple switching regulators.

FIG. 5 illustrates a block diagram of a system that sequentially switches the transistors in multiple supplies. Clock generator 5002 sends a signal (CLOCK) to pulse width modulation (PWM) generator 5004 that turns on the switching transistor of the first regulator in the sequence via signal $V_{g1}$. The length of time that $V_{g1}$ remains active keeping the switching transistor of the first regulator in the sequence on depends on a signal from error generator 5010. The signal from error generator 5010 depends on the output voltage of the first regulator in the sequence. When this control system is used with three supplies as shown in FIG. 1, this would be $V_1$ for regulator 1010. When this control system is used with three supplies as shown in FIG. 2, this would be $V_1$ for regulator 2010. When the switching transistor of the first regulator in the sequence is turned off via signal $V_{g1}$, PWM generator 5006 turns on the switching transistor of the second regulator in the sequence via signal $V_{g2}$. The length of time that $V_{g2}$ remains active keeping the switching transistor of the second regulator in the sequence on depends on a signal from error generator 5012. The signal from error generator 5012 depends on the output voltage of the second regulator in the sequence. When this control system is used with three supplies as shown in FIG. 1, this would be $V_2$ for regulator 1020. When this control system is used with three supplies as shown in FIG. 2, this would be $V_2$ for regulator 2020. When the switching transistor of the second regulator in the sequence is turned off via signal $V_{g2}$, PWM generator 5008 turns on the switching transistor of the third regulator in the sequence via signal $V_{g3}$. The length of time that $V_{g3}$ remains active keeping the switching transistor of the third regulator in the sequence on depends on a signal from error generator 5014. The signal from error generator 5014 depends on the output voltage of the third regulator in the sequence. When this control system is used with three supplies as shown in FIG. 1, this would be $V_3$ for regulator 1030. When this control system is used with three supplies as shown in FIG. 2, this would be $V_3$ for regulator 2030.

Figure 6:
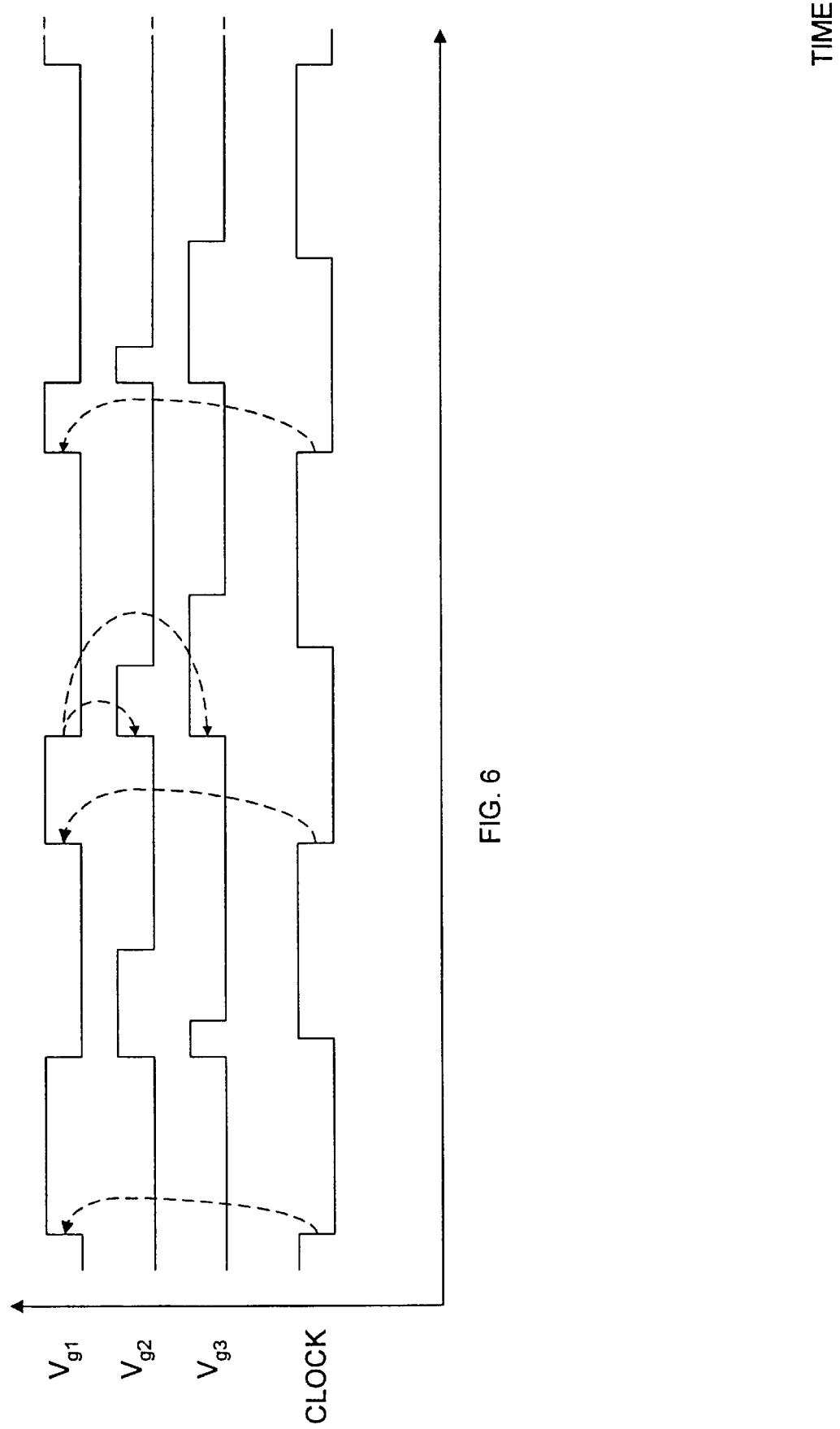
FIG. 6. illustrates a sample set of control waveforms for multiple switching regulators utilizing the simultaneous switching of two regulators sequentially after a first regulator.

FIG. 6. illustrates the control waveforms for multiple switching regulators utilizing the simultaneous switching of two regulators sequentially after a first regulator. In FIG. 6, signal CLOCK is a periodic waveform that sets triggers the switching of the first regulator in the sequence. That regulator is controlled by $V_{g1}$. Note that $V_{g1}$ rises turning on the switching transistor in the first regulator when CLOCK falls. When $V_{g1}$ falls switching off the switching transistor in the first regulator, Vg2 and $V_{g3}$ rise turning on the switching transistors in the second and third power supplies. $V_{g2}$ and $V_{g3}$ then fall independent of each other switching off the switching transistors in the second and third power supplies. The falling edge of signal CLOCK starts the sequence again.

Simultaneous turning on the switching transistors in two or more regulators allows a faster cycle time for signal CLOCK. This is particularly useful when two of the regulators are known, or expected, to have low input power source current when compared to other supplies. These two regulators may then be switched on at the same time to allow for a faster cycle time for signal CLOCK without greatly affecting the peak total input power source current. In addition, in another embodiment, instead of switching two supplies on simultaneously, a fixed delay may be introduced from the switching on of the transistor in one regulator, to the switching on of the transistor in another. This may be useful when the input current to two regulators are thought to roughly track each other, but one is expected to mostly be larger than the other.

Figure 7:
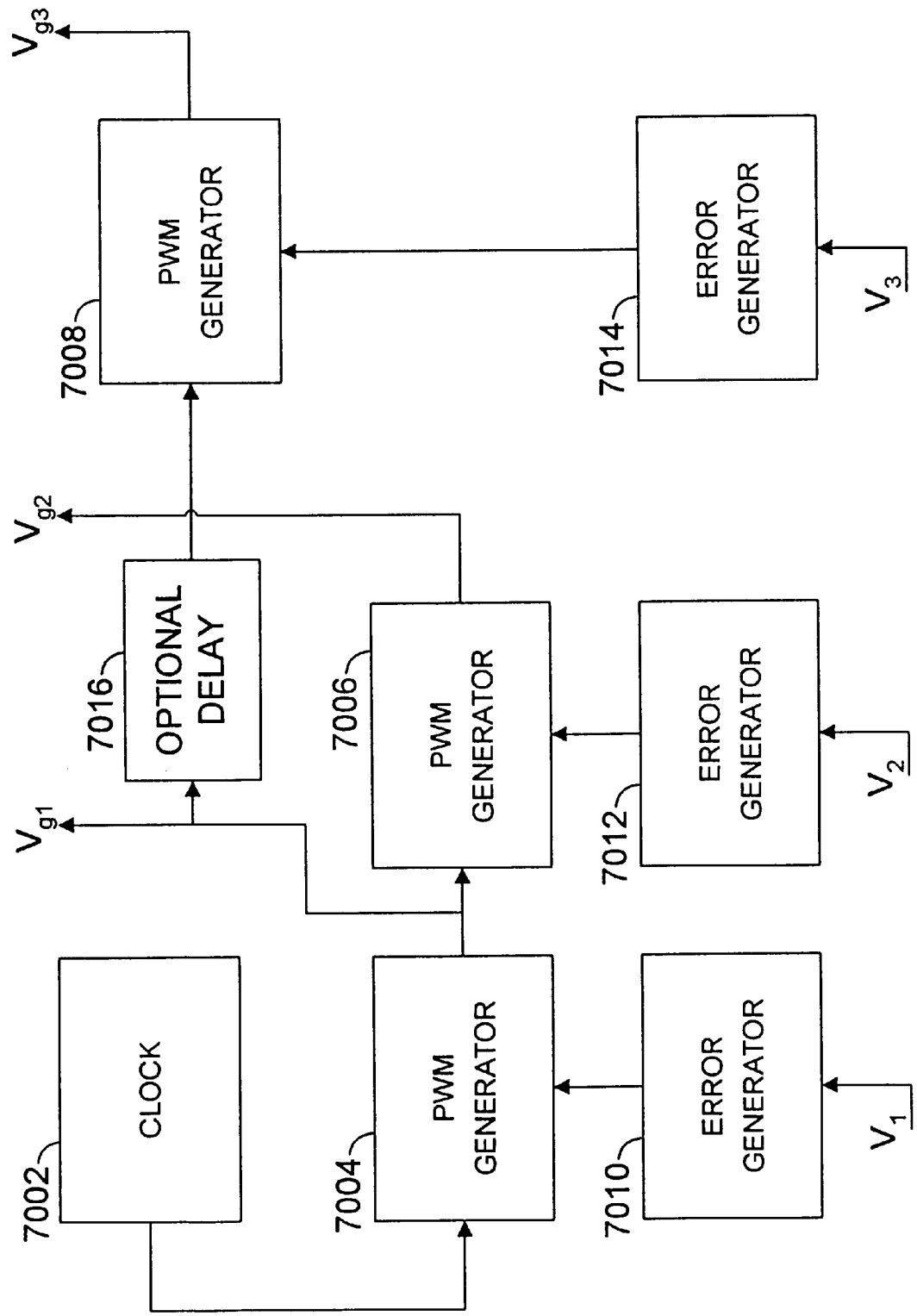
FIG. 7 is a block diagram illustrating a control system that switches two switches sequentially after switching a first regulator.

FIG. 7 is a block diagram illustrating a control system that switches two switches sequentially after switching a first regulator. Clock generator 7002 sends a signal (CLOCK) to pulse width modulation (PWM) generator 7004 that turns on the switching transistor of the first regulator in the sequence via signal $V_{g1}$. The length of time that $V_{g1}$ remains active keeping the switching transistor of the first regulator in the sequence on depends on a signal from error generator 7010. The signal from error generator 7010 depends on the output voltage of the first regulator in the sequence. When this control system is used with three regulators as shown in FIG. 1, this would be $V_1$ for regulator 1010. When this control system is used with three regulators as shown in FIG. 2, this would be $V_1$ for regulator 2010. When the switching transistor of the first regulator in the sequence is turned off via signal $V_{g1}$, PWM generator 7006 turns on the switching transistor of the second regulator in the sequence via signal $V_{g2}$. The length of time that $V_{g2}$ remains active keeping the switching transistor of the second regulator in the sequence on depends on a signal from error generator 7012. The signal from error generator 7012 depends on the output voltage of the second regulator in the sequence. When this control system is used with three regulators as shown in FIG. 1, this would be $V_2$ for regulator 1020. When this control system is used with three regulators as shown in FIG. 2, this would be $V_2$ for regulator 2020. Also when the switching transistor of the first regulator in the sequence is turned off via signal $V_{g1}$, PWM generator 7008 turns on the switching transistor of the third regulator in the sequence via signal $V_{g3}$ after an optional time delay 7016. If no time delay is wanted, PWM generator 7008 turns on the switching transistor of the third regulator in the sequence via signal $V_{g3}$ at the same time that PWM generator 7006 turns on the switching transistor of the second regulator via signal $V_{g2}$. The length of time that $V_{g3}$ remains active keeping the switching transistor of the third regulator in the sequence on depends on a signal from error generator 7014. The signal from error generator 7014 depends on the output voltage of the third regulator in the sequence. When this control system is used with three regulators as shown in FIG. 1, this would be $V_3$ for regulator 1030. When this control system is used with three regulators as shown in FIG. 2, this would be $V_3$ for regulator 2030.

Figure 8:
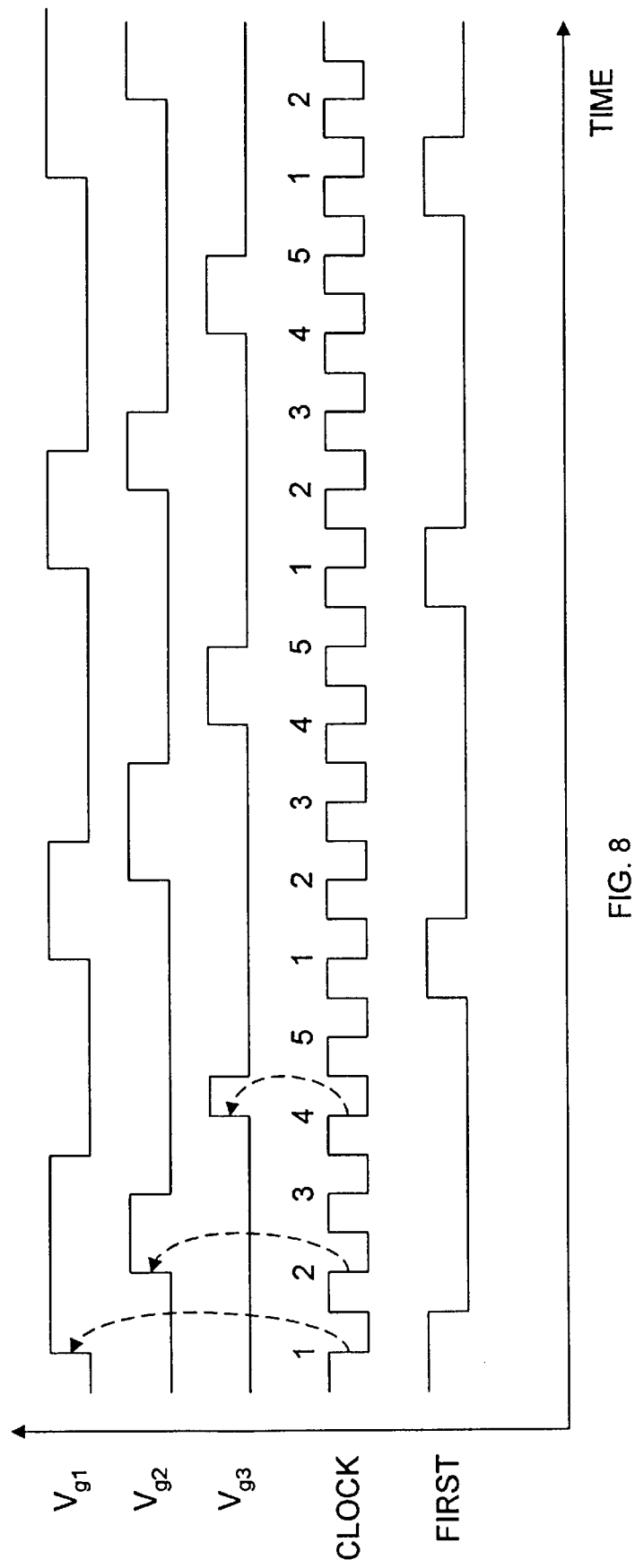
FIG. 8 illustrates a sample set of control waveforms for multiple switching regulators switching transistors at predetermined times.

FIG. 8 illustrates control waveforms for multiple switching regulators that turn on switching transistors at predetermined times. Signal CLOCK is a periodic waveform that is used as the timebase for turning on the switching transistors in the multiple supplies. Signal FIRST is a signal that when active shows which cycle of CLOCK marks the beginning of a new switching cycle. In FIG. 8, the switching transistor in the first regulator is turned on via $V_{g1}$ rising during the first cycle of CLOCK. The switching transistor in the second regulator is turned on via $V_{g2}$ rising during the second cycle of CLOCK. The switching transistor in the third regulator is turned on via $V_{g3}$ rising during the forth cycle of CLOCK. Each of the control signals $V_{g1}$, $V_{g2}$, and $V_{g3}$ fall independently. The falling edge of signal CLOCK starts the sequence again. The activation of signal FIRST starts a new switching cycle.

Figure 9:
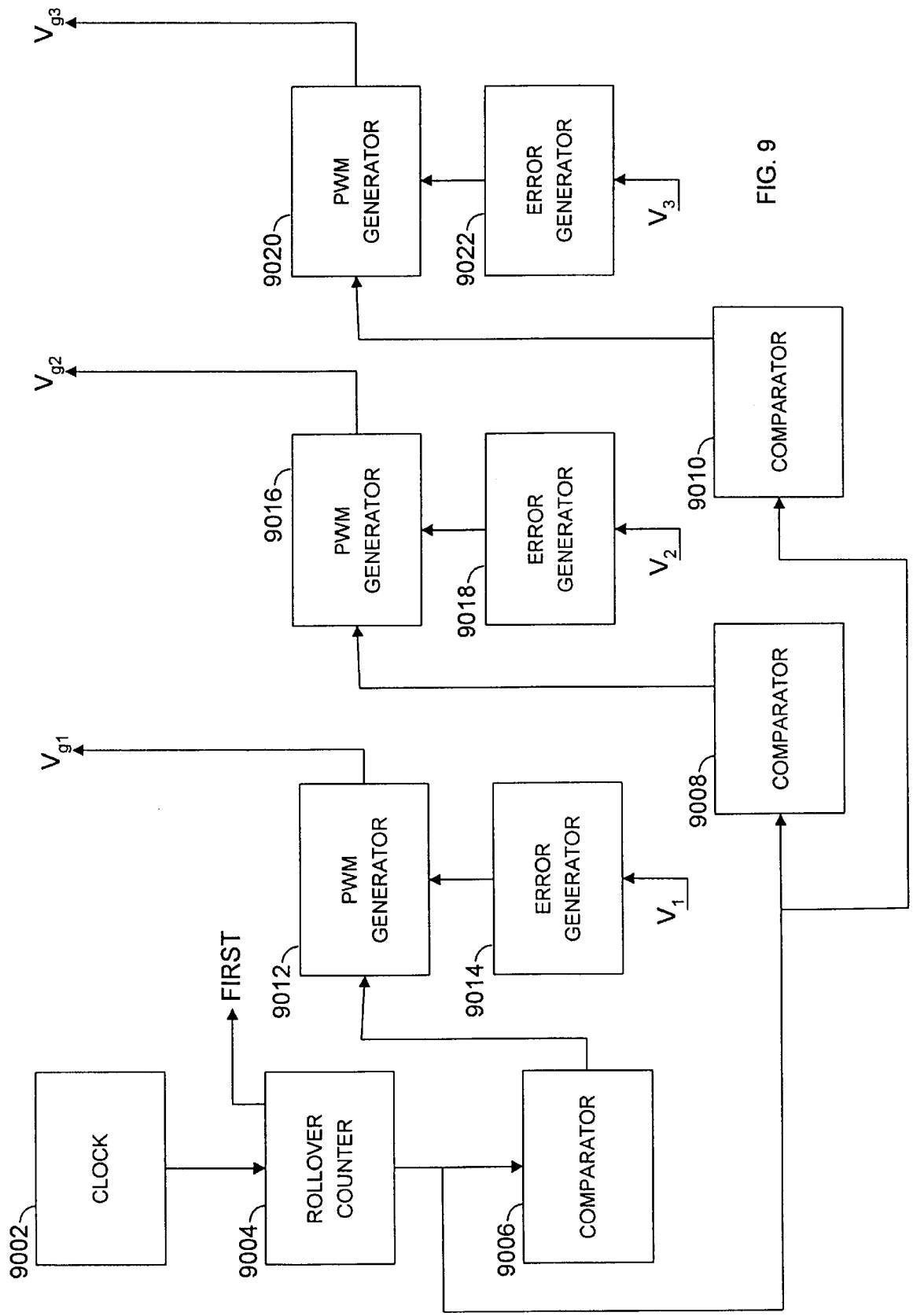
FIG. 9 is a block diagram illustrating a control system that switches on the switching transistors of multiple switching regulators at predetermined times.

FIG. 9 is a block diagram illustrating a control system that can switch on switching transistors of multiple switching regulators at predetermined times. Clock generator 9002 produces signal CLOCK that provides a periodic waveform that is used as the timebase for the system. CLOCK is input to rollover counter 9004. Rollover counter 9004 takes the input pulses of clock and produces a digital output that is a count of those pulses. At a predetermined count, the rollover counter resets its output to a first count number and activates signal FIRST until another pulse is received on CLOCK. This produces a cyclic sequence on the outputs of rollover counter 9004. In FIG. 8, this would be 1,2,3,4,5,1,2 . . . with FIRST being produced during the "1" part of the sequence.

The count output of rollover counter is input to comparators 9006, 9008, and 9010. Each of these comparators produces a signal when its input matches a predetermined number. If FIG. 8 is used as an example, then comparator 9006 would produce a signal when its input was 1, comparator 9008 would produce a signal when its input was 2, and comparator 9010 would produce a signal when its inputs was 4.

The signal generated by comparator 9006 triggers pulse width modulation (PWM) generator 9006 to turn on the switching transistor of a first regulator via signal $V_{g1}$. The length of time that $V_{g1}$ remains active keeping the switching transistor of that regulator on depends on a signal from error generator 9014. The signal from error generator 9014 depends on the output voltage of that regulator. When this control system is used with three supplies as shown in FIG. 1, this output voltage would be $V_1$ for regulator 1010. When this control system is used with three supplies as shown in FIG. 2, this output voltage would be $V_1$ for regulator 2010.

The signal generated by comparator 9008 triggers pulse width modulation (PWM) generator 9016 to turn on the switching transistor of a second regulator via signal $V_{g2}$. The length of time that $V_{g2}$ remains active keeping the switching transistor of that regulator on depends on a signal from error generator 9018. The signal from error generator 9018 depends on the output voltage of that regulator. When this control system is used with three regulators as shown in FIG. 1, this output voltage would be $V_2$ for regulator 1020. When this control system is used with three regulators as shown in FIG. 2, this output voltage would be $V_2$ for regulator 2020.

The signal generated by comparator 9010 triggers pulse width modulation (PWM) generator 9020 to turn on the switching transistor of a third regulator via signal $V_{g3}$. The length of time that $V_{g3}$ remains active keeping the switching transistor of that regulator on depends on a signal from error generator 9022. The signal from error generator 9022 depends on the output voltage of that regulator. When this control system is used with three regulators as shown in FIG. 1, this output voltage would be $V_2$ for regulator 1020. When this control system is used with three regulators as shown in FIG. 2, this output voltage would be $V_2$ for regulator 2020.

One way to choose the predetermined times to switch on the switching transistors of the multiple supplies is to choose the times that will result in the minimum peak input power source current. If the maximum input currents to each regulator for each load situation are known or estimated, the length of each control ($V_{g1}$, $V_{g2}$, etc.) pulse can be determined. This information, the input voltage, and the design of each regulator give enough data to determine the input current waveform for each regulator in a given load situation. These input current waveforms can then be used to determine when to start each control pulse so that the peak input power source current is minimized.

In FIGS. 4–9, the CLOCK signal is shown as having a constant period. However, a variable period clock may be used in any of these. This variable period (or frequency) clock may be derived in response to changing loads on the multiple power supplies, or some other control system variables. In addition, these systems have been shown as block diagrams of discrete blocks, it should be understood that any of these systems could be implemented using a microcontroller, other processor, or custom integrated circuit. Any of these systems may also take into account more variables than is shown when arranging, or timing, control pulses. For example, a microcontroller may know that it is about to perform a number of functions that require a great deal of power on a certain voltage supply. Before performing those operations, the microcontroller may rearrange, or change the timing of, the control pulses so that when these functions are performed, the peak input power source current will be minimized when that regulator begins to pull greater input current.

Although several specific embodiments of the invention have been described and illustrated, the invention is not to be limited to the specific forms or arrangements of parts so described and illustrated. The invention is limited only by the claims.

What is claimed is:

1. A power supply, comprising:
   an input power source;
   a first switching regulator, said first switching regulator increasing and decreasing current drawn by said first switching regulator from said input power source;
   a second switching regulator, said second switching regulator increasing and decreasing current drawn by said second switching regulator from said input power source; and,
   a switching controller, said switching controller causing said second switching regulator to increase current drawn by said second switching regulator from said input power source after said switching controller causes said first switching regulator to decrease current drawn by said first switching regulator from said input power source.

2. The power supply of claim 1, further comprising:
   a third switching regulator, said third switching regulator increasing and decreasing current drawn by said third switching regulator from said input power source and wherein said switching controller causes said third switching regulator to increase current drawn by said third switching regulator from said input power source after said switching controller causes said second switching regulator to decrease current drawn by said second switching regulator from said input power source.

3. The power supply of claim 1, further comprising:
   a third switching regulator, said third switching regulator increasing and decreasing current drawn by said third switching regulator from said input power source and wherein said switching controller causes said third switching regulator to increase current drawn by said third switching regulator from said input power source after said switching controller causes said first switching regulator to decrease current drawn by said first switching regulator from said input power source.

4. The power supply of claim 3, wherein said switching controller causes said third switching regulator to increase current drawn by said third switching regulator from said input power source a fixed time delay after said switching controller causes said first switching regulator to decrease current drawn by said first switching regulator from said input power source.

5. The power supply of claim 1, further comprising:
   a third switching regulator, said third switching regulator increasing and decreasing current drawn by said third switching regulator from said input power source and wherein said switching controller causes the order of the increasing and decreasing of current drawn by said second switching regulator and the increasing and decreasing of current drawn by said third regulator to lower the peak amount of current drawn from said input power source.

6. The power supply of claim 5 wherein said controller also alters the timing of the increasing and decreasing of the current drawn by said second switching regulator and the timing of the increasing and the decreasing of the current drawn by the third switching regulator to lower the peak amount of current drawn from said input power source.

7. A power supply, comprising:
   an input power source;
   a first switching regulator, said first switching regulator drawing current from said input power source;
   a second switching regulator, said second switching regulator drawing current from said input power source; and,
   a switching controller, said switching controller causing said first switching regulator to change the current drawn by said first switching regulator from said input power source at a first time in a cycle and said switching controller causing said second switching regulator to change the current drawn by said second switching regulator from said input power source at a second time in said cycle.

8. The power supply of claim 7 wherein said first time and said second time are chosen to lower a peak input current drawn from said input power source.

9. The power supply of claim 8 wherein said switching controller chooses said first time and said second time.

10. A power supply, comprising:
    an input power source;
    a plurality of switching regulators drawing input currents from said input power source; and,
    a switching controller, said switching controller causing said input currents to initiate a change in magnitude of said input currents in a first direction in a first sequence.

11. The power supply of claim 10 wherein said first sequence lowers the peak current drawn from said input power source when compared to unsequenced changes of said input currents.

12. The power supply of claim 10 wherein said switching controller chooses between said first sequence and a second sequence to lower the peak current drawn from said input power source.

13. A power supply, comprising:
    a plurality of switching regulators drawing input currents from said input power source; and,
    a switching controller, said switching controller causing each of said switching regulators to initiate a change in magnitude of said input currents in a first direction at a predetermined time in a cycle.

14. The power supply of claim 13 wherein the predetermined times in a cycle for each of said plurality of switching regulators form a first set of predetermined times and said switching controller determines a second set of predetermined times that will produce a lower peak current drawn from said input power source than said first set of predetermined times and said controller changes the times it initiates a change in magnitude of said input currents in a first direction to said second set of predetermined times.

15. A method of reducing peak input current to a set of switching regulators sharing the same input power source, comprising:

(a) increasing the magnitude of current drawn by a switching regulator;

(b) decreasing the magnitude of current drawn by a switching regulator; and, (c) repeating steps (a)–(c) for a next switching regulator in a sequence.

16. The method of claim 15 wherein said step (c) occurs after said step (b).

17. The method of claim 15 wherein said step (c) does not occur after said step (b).

18. A method of reducing peak input current to a set of switching regulators sharing the same input power source, comprising:

choosing a sequence to switch said set of switching regulators that minimizes peak current drawn from said input power source; and, controlling said switching regulators to switch in said sequence.

19. A method of reducing peak input current to a set of switching regulators sharing the same input power source, comprising:

determining a first set of predetermined times to switch said switching regulators that minimizes peak current drawn from said input power source under a first set of load conditions; and, controlling said switching regulators to switch at said first set of predetermined times.

20. The method of claim 19, further comprising:

determining a second set of predetermined times to switch said switching regulators that minimizes peak current drawn from said input power source under a second set of load conditions; and, controlling said switching regulators to switch at said second set of predetermined times when said second set of load conditions occur.

* * * * *